(12) United States Patent
Piccinali

(10) Patent No.: US 7,566,078 B2
(45) Date of Patent: Jul. 28, 2009

(54) SYSTEM FOR ASSEMBLING A HIGH-PRESSURE FLUID TUBE AND A FITTING ELEMENT, AND FITTING OBTAINED BY THIS SYSTEM

(75) Inventor: Eugenio Piccinali, Luino (IT)

(73) Assignee: Meccanica Finnord S.p.A., Luino (VA) (IT)

( * ) Notice: Subject to any disclaimer, the term of this patent is extended or adjusted under 35 U.S.C. 154(b) by 48 days.

(21) Appl. No.: 11/825,914

(22) Filed: Jul. 10, 2007

(65) Prior Publication Data
US 2008/0036203 A1   Feb. 14, 2008

(30) Foreign Application Priority Data
Aug. 11, 2006  (IT)  .......................... MI2006A1621

(51) Int. Cl.
F16L 33/00 (2006.01)
(52) U.S. Cl. ..................................... 285/256
(58) Field of Classification Search ................. 285/256, 285/257, 258
See application file for complete search history.

(56) References Cited

U.S. PATENT DOCUMENTS

| 3,711,131 | A | * | 1/1973 | Evans | 285/256 |
| 4,544,187 | A | * | 10/1985 | Smith | 285/256 |
| 5,553,896 | A | * | 9/1996 | Woodward | 285/256 |
| 5,797,629 | A | * | 8/1998 | Beagle | 285/256 |
| 6,764,106 | B1 | * | 7/2004 | Smith et al. | 285/256 |
| 7,384,074 | B2 | * | 6/2008 | He | 285/256 |

* cited by examiner

Primary Examiner—David E Bochna
(74) Attorney, Agent, or Firm—Notaro & Michalos P.C.

(57) ABSTRACT

A system for assembling a high-pressure fluid tube on a tubular pin, is part of a fitting element provided to be used in particular on motor-vehicles, for example for the production of pipes intended for manufacturing braking circuits or other circuits, in which high-pressure oil or other fluids flow. The system has a first inner layer made of plastic, a second layer made of a steel plait or other suitable material such as fibers or the like, a third coating layer of plastic material and a bush made of steel, alloy or other material, fitted into an end of the tube. The tube is fitted on the pin and locked by crimping of a metallic bush having a radial flange extending into an annular groove of the pin and distorting an O-ring in the groove between the flange and the pin.

2 Claims, 1 Drawing Sheet

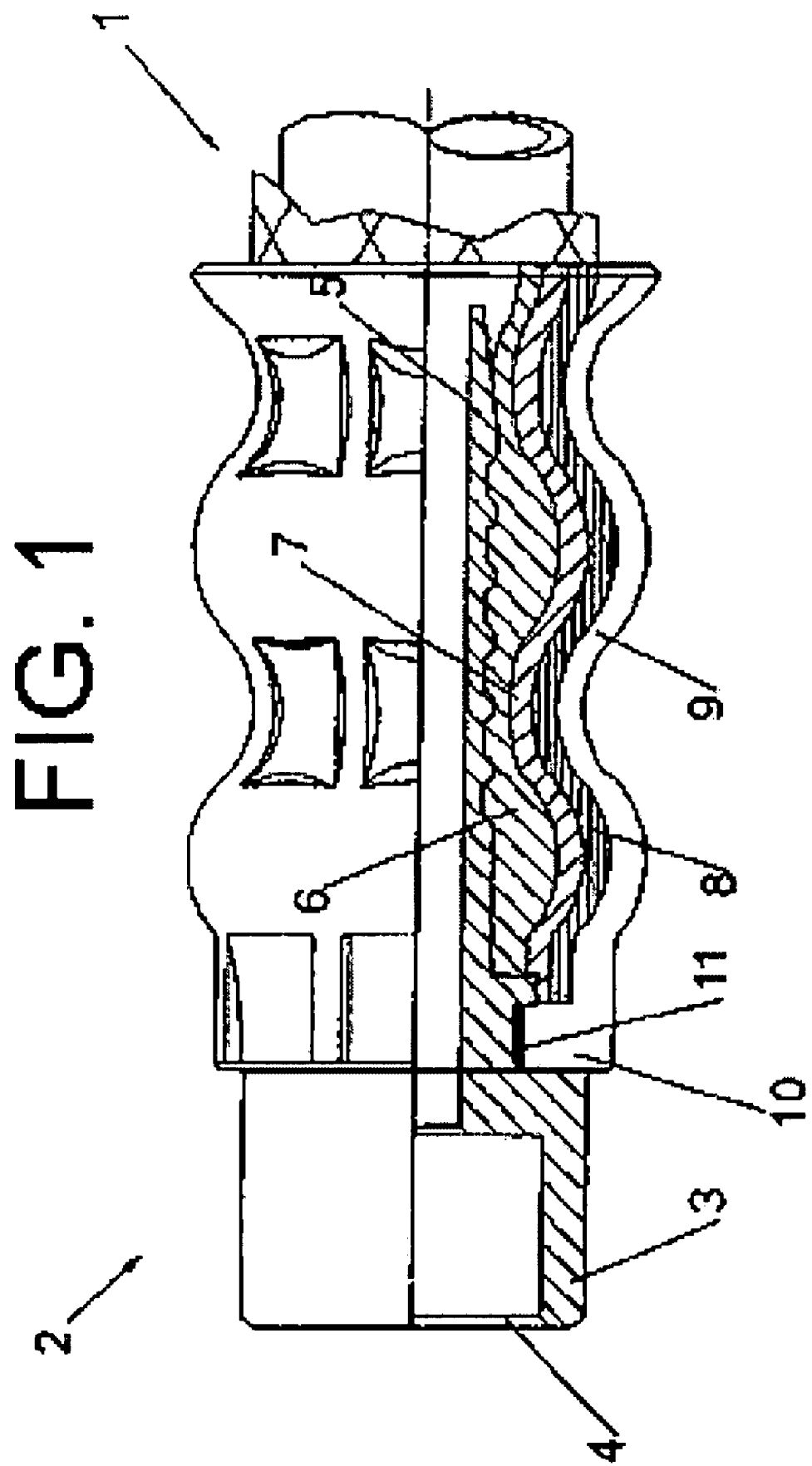

SYSTEM FOR ASSEMBLING A HIGH-PRESSURE FLUID TUBE AND A FITTING ELEMENT, AND FITTING OBTAINED BY THIS SYSTEM

FIELD AND BACKGROUND OF THE INVENTION

The present invention refers to a system for assembling a high-pressure fluid tube on a tubular pin, which is part of a fitting element provided to be used in particular on motorcycles and motor-vehicles, for example for the production of pipes intended for manufacturing braking circuits or other circuits, in which high-pressure oil or other fluids flow.

In particular, the invention relates to a system for assembling a high-pressure fluid tube of the kind comprising a first inner layer made of plastic, a second layer made of a steel plait or other suitable material such as fibers or the like, a third coating layer, if any, made, for instance, of plastic material and a bush made of steel, alloy or other material, fitted into an end of the said tube, this tube being fitted on the pin and locked by crimping of the metallic bush.

In order to avoid any oil leakage, which may occur in the vehicle systems made by the known methods, the invention teaches to create, in the pin where the tube is fitted into, an annular groove assigned to lodge an O-ring type gasket.

In this groove, after crimping of the metallic bush, an end of the bush is overlaid, until the end presses and distorts the gasket, which is thus locked against the grooves sides, thus preventing any seepage.

The system for assembling according to the invention enables to create, without the use of particularly complex and expensive equipment or systems, tube fittings for high-pressure fluid, which guarantee a total tightness and, as a result of it, are able to pass the strict tests provided for by the regulations on this subject.

As it is known, most of vehicles equipped, provided with circuits that bring fluids under pressure, comprise also parts made of hoses, provided at the ends with fittings elements to be coupled with corresponding elements fitted on the vehicle.

The said hoses comprise, in general, three of more layers: an inner layer made of plastic, an intermediate layer consisting of a steel plait able to resist internal high pressure, and a third layer, a coating layer, made of plastic.

At the ends, on the hoses, metal bushes are fitted into, generally made of steel, which are then locked by crimping, to lock the hose on the pin.

On the other hand, it often happens that due to the high pressure, the fluid circulating in the hose, even if in a small amount, seeps between the hose internal and external wall of the pin, thus affecting, over the time, the correct operation of the system, with the risk of creating hazardous situations.

The sector feels therefore the need to be provided with means capable of assembling a high-pressure fluid tube on a pin, which is a part of a fitting, thus guaranteeing the system to be perfectly sealed.

SUMMARY OF THE INVENTION

This system is now solved by this invention, which refers to system for assembling a high-pressure fluid tube, provided, in the pin body, with an annular seating, wherein an O-ring type gasket is fitted.

In this seating, one end of the said metal or alloy bush is inserted, which distorts during the crimping and pushes and distorts the gasket, by pressing it against the walls of the seating and thus guaranteeing a total tightness.

BRIEF DESCRIPTION OF THE DRAWING

This invention will be now described in detail, by way of example but without any limitation thereto, with reference to the drawing annexed hereto, wherein FIG. 1 shows, in section, the end of a high-pressure tube fitted on a fitting element according to the invention.

DESCRIPTION OF THE PREFERRED EMBODIMENT

With reference to the drawing, reference number 1 indicates, as a whole, the end of a high-pressure tube, fitted on a fitting element indicated, as a whole, with reference number 2.

This fitting element is substantially composed of a body 3, which is provided with a thread 4 or, however, known means suitable to allow the seal thereof with a complementary fitting element fitted on the vehicle, and a pin 5 on which the end of the tube 1 is fitted.

The latter consists of an inner layer 6 made of plastic, such as, in particular, PTFE or also other plastic material, for example PA12 or PA11 or the like, one intermediate layer 7 consisting of a steel crossed mesh or of textile material such as Gore-Tex, in carbon fiber, or in other material capable of resisting the high-pressures of fluid circulating inside the tube, and, if necessary, a third external coating layer 8, made of rubber or plastic, for example PA.

A bush made of suitable metal, which can be steel, brass, an alloy or otherwise, indicated with reference number 9, is fitted on the end wall of the tube. The bush 9 is distorted by crimping as shown in the drawing, in such a way as to tighten lock it around the said tube.

The invention is characterized in that it provides, in the fitting element 2, for an annular groove 10, in the base of the pin 5 into which a radial flange of the bush 9 extends, and in which a gasket 11 is lodged, preferably an 0-ring type gasket.

During the crimping operation, the edge of the metal or alloy bush 9 is bended and pushed inside the annular groove 10, thus exerting pressure on gasket 11, which distorts and is then heavily pressed against the groove walls, thus creating a perfect seal. Bush 9 is crimped over an extending portion of the tubular pin 5 that extends away from the annular groove 10, opposite from the body 3 of the pin 5.

As it can be clear from the description above, the tube according to the invention requires an extremely inexpensive production method, since it permits to use the same equipment and the same components used until now for fittings of the known art, without the need of particular investments.

The dimensions, as well as the materials used, may vary according to the needs of use.

The invention claimed is:

1. System for assembling a high-pressure fluid tube on a tubular pin, comprising:
   the tubular pin having a body, an annular groove adjacent the body, and an extending portion extending away from the annular groove;
   a fitting element having a metal bush crimped over the tubular pin with a radial flange extending into the annular groove of the tubular pin and the crimped bush extending over the extending portion of the tubular pin;

an O-ring gasket in said annular groove that is distorted and tightly fixed between the radial flange and the tubular pin by the crimping of the bush, for sealing the bush to the tubular pin;

the distortion of the gasket pressing the gasket against walls of said groove to create tightness between the radial flange and the tubular pin in the annular groove; and the high-pressure fluid tube being between the crimped bush and the extending portion of the tubular pin.

2. System for assembling a high-pressure fluid tube according to claim 1, wherein said bush is crimped so it distorts inwardly for engaging the high-pressure fluid tube along the extending portion of the tubular pin and for penetrating into said groove, the high-pressure fluid tube having a plastic layer over the extending portion of the tubular pin, an intermediate layer for resisting high pressure over the plastic layer, and an external coating layer made of rubber or plastic over the intermediate layer and under the bush.

* * * * *